United States Patent [19]

Stoffer

[11] 3,870,899

[45] Mar. 11, 1975

[54] RECEIVER PROTECTION CIRCUIT APPARATUS

[75] Inventor: Cornelis Daniel Stoffer, Markham, Ontario, Canada

[73] Assignee: Rockwell International Corporation, Dallas, Tex.

[22] Filed: Dec. 14, 1973

[21] Appl. No.: 424,995

[52] U.S. Cl. .................. 307/235, 307/202, 307/235, 307/257, 179/1 VC

[51] Int. Cl. .......................... H03k 5/70, H03k 17/74

[58] Field of Search ........... 307/290, 235, 257, 202; 325/254; 179/1 SW

[56] References Cited

UNITED STATES PATENTS

| | | | |
|---|---|---|---|
| 3,126,449 | 3/1964 | Shirman | 307/290 |
| 3,211,227 | 10/1965 | Klee | 307/290 |
| 3,330,912 | 7/1967 | Koskei | 179/1 VC |
| 3,351,863 | 11/1967 | Riemens | 307/237 X |
| 3,395,255 | 7/1968 | Clement | 179/1 VC |

FOREIGN PATENTS OR APPLICATIONS

| | | | |
|---|---|---|---|
| 24,510 | 1/1963 | East Germany | 307/290 |

*Primary Examiner*—Michael J. Lynch
*Assistant Examiner*—B. P. Davis
*Attorney, Agent, or Firm*—Bruce C. Lutz

[57] ABSTRACT

A switching circuit for sensing the amplitude of input signals and deactivating a series switch to prevent application of high voltages to sensitive circuitry connected to the antenna input leads.

3 Claims, 1 Drawing Figure

PATENTED MAR 11 1975

3,870,899

RECEIVER PROTECTION CIRCUIT APPARATUS

THE INVENTION

Figure 1:
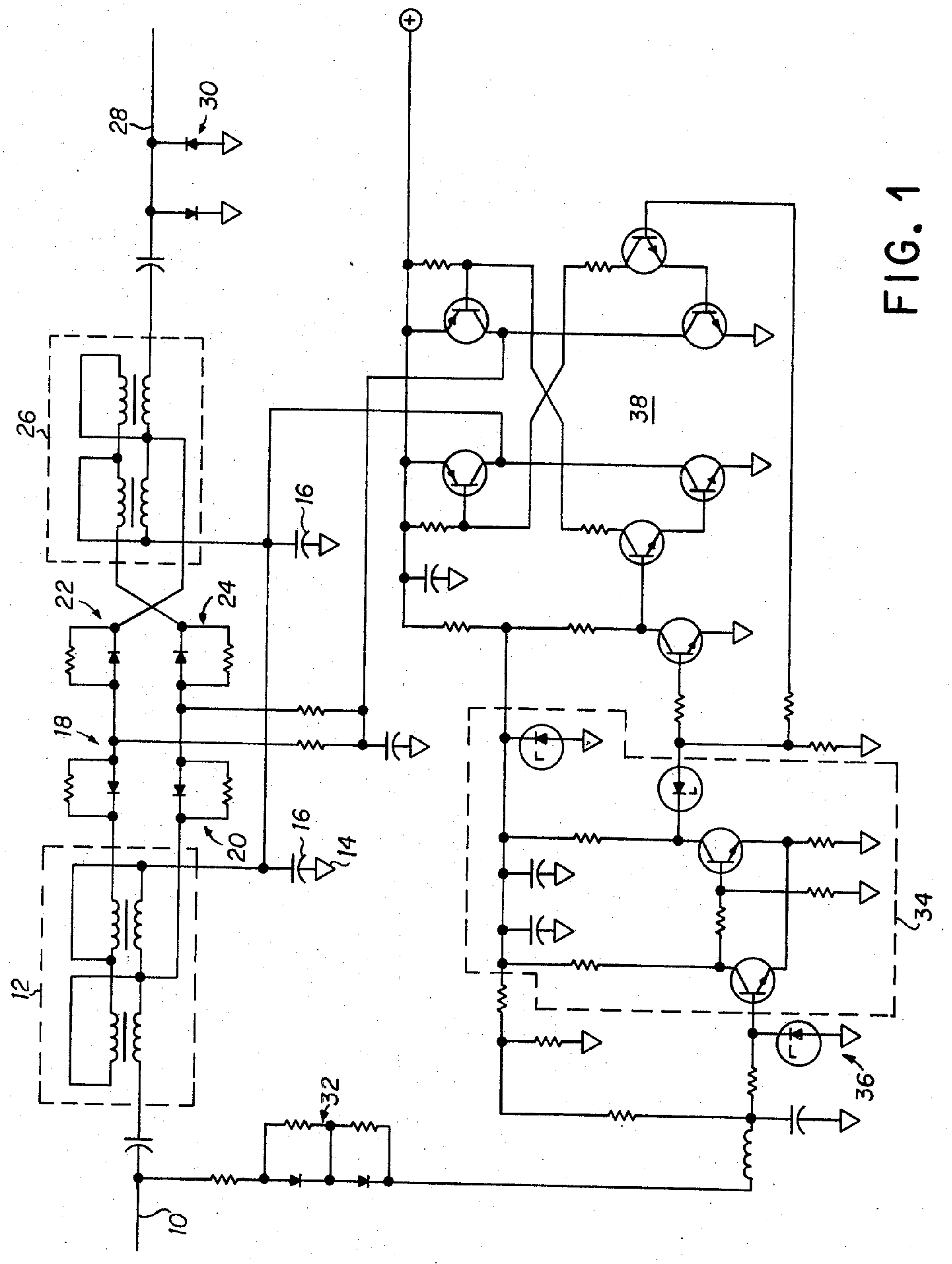

The present invention is generally related to electronics and more specifically related to radio signal receiver circuitry. Even more specifically it is related to means for decoupling input detection circuitry from an antenna when incoming signals are of too large an amplitude.

When receiving and transmitting antennas are placed too close together the transmitted signal can overload the receiving circuitry and in some cases, cause permanent damage. The prior art procedure to prevent this problem generally involves the use of a series impedance, followed by non-linear elements such as diodes to limit the voltage input to the receiver. This prior art has a serious disadvantage, namely, that to protect against large input voltages, high power levels must be dissipated in the protective circuitry, and its insertion in the circuit introduces substantial losses to desired signals. This loss inputted to the desired signal can only be compensated for by an improved receiver noise figure, which is difficult to achieve.

An improved approach, described herein, utilizes an input voltage sensitive series switching element to achieve the desired protection. The method introduces minimal loss to the desired signal, and provides protection by opening the line, rather than attempting to dissipate the unwanted signal.

It is, therefore, an object of the present invention to provide an improved receiver protection circuit.

Other objects and advantages will be apparent from a reading of the specification and attached claims in conjunction with the drawing wherein the single FIGURE is a schematic diagram of one embodiment of the invention.

Input 10, in the drawing, supplies input signals through a capacitor to a dash line block 12 which incorporates a series of windings. The series of windings are shown connected as connected in the actual circuit. However, the winding connection accomplishes the function of a transformer having a single primary winding and a center tapped secondary winding. The center tap of the secondary winding is connected to ground 14 through one or more capacitors 16. The end leads of this secondary winding are connected to resistor-diode combinations or unidirectional current control means 18 and 20, respectively. A second set of resistor diode combinations 22 and 24 are also shown. These two sets of diodes are connected together and the outputs of the diode resistor combinations 22 and 24 are connected to a second series of windings in dash line block 26 which comprise a center tapped primary winding and a single output winding which is connected to the output terminal 28. A pair of diodes generally designated as 30 are also connected to output 28 for clipping the amplitude of signals reaching the output. A set of diodes generally designated as 32 is connected between input 10 and a circuit generally designated as 34 and containing a circuit typically known as a Schmitt trigger. The diodes 32 pass a signal to be applied to a zener diode circuit generally designated as 36 and forming the input of the Schmitt trigger 34. An output of Schmitt trigger 34 is supplied to a set of transistors connected in a switching amplifier configuration and generally designated as 38. The output of amplifier 38 is connected between the center taps of the two transformers 12 and 26 and a junction point between the two sets of diodes 18 and 20 and the further set of diodes 22 and 24.

During normal operation, the amplifier 38 is in a condition where the four resistor diodes are biased such that there is a current flow through each of the diodes to ground. Thus, incoming signals applied at terminal 10 pass through the transformer 12, the four diodes and proceed to the output 28 through transformer 26. If the signals are of an amplitude that is greater than the forward voltage drop through the diodes 30, but not enough to trigger the Schmitt trigger 34, the signals appearing at 28 will be amplitude limited. However, if the invput voltage becomes large enough to trip the Schmitt trigger 34, the trigger circuit will change the output voltages appearing at the output of switching amplifier 38. In this condition each of the diodes 18 – 24 are back biased and no further input signals will flow therethrough. If the voltage at input 10 is removed or lowered to a much lower value, the Schmitt trigger will revert to its normal condition and cause the switching amplifier 38 to again forward bias the diodes 18 – 24.

Although a single embodiment used to practice the invention is illustrated in the FIGURE, I wish to be limited only by the scope of the claims and not by the particular embodiment shown.

I claim:

1. Signal decoupling means comprising, in combination:

apparatus input means for supplying an input signal;

first transformer means including primary winding means for receiving a signal and tapped secondary winding means;

voltage level sensing means, including input and output means, for providing in the alternative a first output when signals applied to said input means thereof are less than a predetermined value and a second output when signals applied to said input means thereof are greater than said predetermined value, said voltage level sensing means comprising from input means to output means, zener diode means, Schmitt Trigger means, switching amplifier means, and means connecting each of said above named means between said input means and said output means of said voltage level sensing means for providing said second output only when input signals are greater than said predetermined value;

apparatus output means;

means connecting said apparatus input means to said first transformer means and to said input means of said voltage level sensing means for supplying input signals thereto;

secondary transformer means including tapped primary winding and secondary winding means;

means connecting said tapped secondary winding means to said apparatus output means;

diode means connected between the ends of said secondary winding means of said first transformer means and said primary winding means of said secondary transformer means, said diode means comprising, a first pair of diodes with common junctions connected together and the remaining junction of each diode connected to an end of said tapped secondary winding means and said tapped primary means, respectively, and a second pair of diodes similarly connected to the other end of each of said tapped winding means, and the connection of said output means of voltage level sensing means is to the common junction of each of said diode pairs; and means connecting said output means of said voltage level sensing means to the taps of said winding means of said first and second transformer means and to said diode means, said diode means permitting signal passage when said voltage level sensing means provides the first output and restricting signal passage when said voltage level sensing means provides the second output.

2. Balanced RF signal decoupling apparatus comprising, in combination:

apparatus input means for providing RF input signals having a wide range of amplitudes;

first transformer means including a primary winding and a center-tapped secondary winding having first and second ends;

second transformer means including a center tapped primary winding having first and second ends and a secondary winding, the secondary winding providing apparatus output signals;

signal amplitude sensing means, including input means and first and second output terminals for providing reversing polarity output signals between said output terminals as signals applied to said input means thereof pass through predetermined signal amplitude levels;

means connecting said apparatus input means to said primary winding of said first transformer means and to said input means of said signal amplitude sensing means for supplying RF signal thereto;

means connecting said first terminal of said signal amplitude sensing means to said center taps of said first and said second transformer means;

four unidirectional current control means each having a first terminal thereof connected to said second terminal of said signal amplitude sensing means and each unidirectional current control means having a second terminal; and means connecting the second terminals of the four current control means respectively to the four ends of the center tapped winding means of said first and second transformer means.

3. Decoupling apparatus as claimed in claim 2 wherein said signal amplitude sensing means comprises, in combination:

Schmitt trigger means connected to said input means thereof for providing output signals when input signals supplied thereto exceed a predetermined value; and switching amplifier means connected between said Schmitt trigger means and the first and second output terminals of said signal amplitude sensing means for normally providing a first polarity output signal thereto and for reversing polarity of the output signal upon receipt of the output signal from said Schmitt trigger means.

* * * * *